UNITED STATES PATENT OFFICE.

GEORGE BLUM, OF ORLANDO, FLORIDA.

ARTIFICIAL STONE.

SPECIFICATION forming part of Letters Patent No. 338,026, dated March 16, 1886.

Application filed June 16, 1885. Serial No. 168,833. (Specimens.)

*To all whom it may concern:*

Be it known that I, GEORGE BLUM, of Orlando, in the county of Orange and State of Florida, have invented a new and Improved Artificial Stone, of which the following is a full, clear, and exact description.

The object of my invention is to provide a new and improved artificial stone to be used for building-blocks, bricks, ornamental stonework, &c.

The artificial stone is prepared in the following manner: I mix slaked lime, eight parts; sulphur, 0.6 part; sulphuric acid, 0.6 part; chloride of sodium, or common soda, or any other saline matter, dissolved in water, 0.8 part; good clean sand, ninety parts.

The lime is slaked, the salt and other ingredients are thoroughly mixed and soaked, and sufficient water added to form a stiff mortar, which is then filled into the desired molds. The molded blocks, stones, &c., are dried and hardened in the atmosphere, which requires about fifteen days.

The stone resists fire to a red heat, and resists the effect of temperature and sudden changes of the same.

As the stones are composed, mainly, of sand, they are drier than clay, and consequently more healthy. They can be manufactured and sold at a low price with a fair profit.

The bricks are to be made in a special machine, which subjects them to a pressure of one ton per brick. This invention is to be made the object of a later application.

Having thus described my invention, I claim as new and desire to secure by Letters Patent—

An artificial stone or building-block composed of the following ingredients: slaked lime, sulphur, sulphuric acid, common salt or other saline matter, and sand, mixed in the proportions given.

GEORGE BLUM.

Witnesses:
COLLIS ORMSBY,
N. L. MILLS.